United States Patent Office 2,765,336
Patented Oct. 2, 1956

2,765,336
N-HALOFORMAMIDES

Melvin D. Hurwitz, Philadelphia, and Robert W. Auten, Jenkintown, Pa., assignors to Rohm & Haas Company, Philadelphia, Pa., a corporation of Delaware No Drawing. Application July 31, 1951,
Serial No. 239,636

The portion of the term of the patent subsequent to June 2, 1970, has been disclaimed and dedicated to the Public 6 Claims. (Cl. 260—561)

This invention relates to N-haloformamides and to a process for preparing them.

The products of this invention have the formula $$\left[ R - N - C - H \atop X \quad O \right]_n$$

in which R is a monovalent or divalent aliphatic hydrocarbon radical, X is an atom of chlorine or bromine, and $n$ is an integer of value one or two, being one when R is monovalent and two when R is divalent. Typical of such compounds are N-chloro-N-octylformamide, $$C_8H_{17}-N-C-H \atop Cl \quad O$$

and ethylene bis(N-chloroformamide), $$H-C-N-CH_2CH_2-N-C-H \atop O \quad Cl \qquad Cl \quad O$$

These products are made by reacting a hypohalite, preferably a tertiary-alkyl hypohalite such as tert.-butyl hypochlorite with an aliphatic formamide of the general formula, $$\left[ R - NH - C - R \atop O \right]_n$$

in which the characters, R and $n$, have the same significance as is described above. At least one mole of hypohalite is employed for each formamido group in the compound which is to be converted into the haloformamide, and it is preferred to use an excess of 0.1 to 0.5 mole of hypohalite per formamido group.

The reaction can be carried out at a temperature from 0° C. to 100° C. but a temperature from 15° C. to 70° C. is much preferred.

It is to be noted that during the reaction the portion of the molecule which is represented by R in the above formulas remains intact and is not affected by the conditions of operation. The same procedure is followed regardless of whether the group R is a simple alkyl group such as a methyl group or is a branched hydrocarbon chain or is a cyclic hydrocarbon group as in the case when N,N′-dichloro-1,8-diformamido-p-menthane is prepared, having the formula $$\begin{array}{c} CH_3 \quad O \\ | \quad \| \\ C-N(Cl)C-H \\ / \quad \backslash \\ CH_2 \quad CH_2 \\ | \quad | \\ CH_2 \quad CH_2 \\ \backslash \quad / \\ CH \\ | \\ C-N(Cl)C-H \\ / \quad \| \\ CH_3 \quad CH_3 \quad O \end{array}$$

The group represented by R in the above formulas is invariably an aliphatic hydrocarbon radical. It can be a monovalent hydrocarbon radical such as an alkyl group or a cycloalkyl group of 1 to 20 carbon atoms. Thus R represents methyl, ethyl, isopropyl, n-butyl, isobutyl, sec.-butyl, tert.-butyl, amyl, 2-ethylhexyl, n-octyl, diisobutyl, lauryl, tetradecyl and octadecyl groups as well as the homologous and isomeric groups of the foregoing. R likewise represents a saturated alicyclic group such as cyclopentyl, cyclohexyl, methylcyclohexyl, p-menthyl, and the like. The character, R, also stands for a saturated divalent aliphatic hydrocarbon group, or an alkylene group, containing 2 carbons (i. e. ethylene group, —$C_2H_4$—) or containing 5 to 20 carbon atoms, typified by hexylene, octylene, dodecylene, octadecylene groups as well as the homologous and isomeric groups thereof. R can not represent an alkylene group of 3 or 4 carbon atoms because formamides containing propylene or butylene groups are not operable in the instant process.

The formamides from which the N-haloformamides are made by the process of this invention are available and are themselves conveniently made, for example, by the reaction of hydrogen cyanide and sulfuric acid on monoolefins and diolefins. Mixtures of the formamides, particularly mixtures of isomeric formamides, can be converted into corresponding mixtures of the N-haloformamides.

It has been found that inorganic hypochlorites and hypobromites such as those of sodium or potassium, or even hypohalous acids, can be used but that the results are not as satisfactory as when a tertiary-alkyl hypohalite is employed. And while it is also true that any tertiary-alkyl hypohalite can be used it is preferred to employ those containing a tert.-butyl or tert.-amyl group for reasons of efficiency and economy.

The following examples serve to illustrate the process of this invention.

EXAMPLE 1

N-chloro-tert.-octylformamide

Into a three-necked flask equipped with stirrer, gas-inlet tube, reflux condenser and thermometer was charged 20 grams (0.13 mole) of tert.-octylformamide (2-form-amido-2,4,4-trimethylpentane), and 100 grams of water. Chlorine gas was bubbled through the stirred mixture over a period of 2.5 hours while the mixture was held at 30–35° C.

Thereafter the aqueous layer was removed and was extracted with benzene. The organic layer and the benzene extract were combined and dried by means of anhydrous magnesium sulfate. The mixture was then fractionally distilled and there was obtained a 57% yield (14.0 grams) of colorless N-chloro-tert.-octylformamide, having a boiling point of 89–93° C. at 0.3 mm. of pressure (Hg). Its structure $$\begin{array}{ccc} CH_3 & CH_3 \\ | & | \\ CH_3-C-CH_2-C-N-CH \\ | & | & | \quad \| \\ CH_3 & CH_3 \quad Cl \quad O \end{array}$$

was confirmed by analysis.

EXAMPLE 2

Tert.-butyl-N-chloroformamide

A three-necked flask equipped with stirrer, reflux condenser, thermometer and dropping funnel was charged with 101 grams (1.0 mole) of tert.-butylformamide. Then 119 grams (1.1 moles) of tert.-butylhypochlorite was added dropwise while the temperature was held at 25–30° C. After four hours, the mixture was distilled and a 78% yield (104.8 grams) of tert.-butyl-N-chloroformamide, $$(CH_3)_3C-N-CH \atop Cl \quad O$$

was collected. It boiled at 48–52° C./0.1–0.15 mm. Analysis showed that the product contained 10.2% nitrogen and 25.8% chlorine as against theoretical values of 10.65% and 26.2% respectively.

It should be noted that distillation of the N-haloformamides is not recommended as a means of purification. It is much preferred to strip off solvents and reactants and then recrystallize the N-haloformamide from a solvent such as benzene.

The N-chloroformamides of methyl, n-butyl, 2-n-octyl, tert.-octyl, tert.-dodecyl, tert.-octadecyl, and cyclohexyl formamides were prepared in a similar manner. Distillation of the resultant N-haloformamides was, however, omitted and after the stripping of the excess reactants the N-haloformamides were obtained as crystalline solids.

EXAMPLE 3

*Ethylene bis(N-chloroformamide)*

In a similar manner, 434 grams (4 moles) of tert.-butylhypochlorite and 232 grams (2 moles) of ethylene diformamide were mixed together at room temperature. On the addition of 1 gram of water, an exothermic reaction started and the mixture became homogeneous. The temperature was held at 35°–40° C. for four hours during which time a product crystallized out. This material which was separated and analyzed was ethylene bis(N-chloroformamide) having the formula $$\underset{O\ \ Cl}{HC-N-C_2H_4-N-CH}\ \ \underset{Cl\ O}{}$$

(Analysis: Found, N=14.9% and Cl=37.5%; calculated, N=15.0% and Cl=37.7%.

Hexamethylene bis(N-chloroformamide) was prepared in a similar way from hexamethylene diformamide, as was N,N'-dichloro-1,8-diformamido-p-menthane from 1,8-diformamido-p-menthane. Efforts, however, to prepare the bis(chloroformamide) from diformamidopropane failed.

EXAMPLE 4

*N-chloro-n-butylformamide*

One mole of n-butylformamide was treated with 1.5 moles of sodium hypochlorite (as a 5% aqueous solution) at −1° C. An exothermic reaction carried the temperature up to 6° C. at which point the mixture was held for two hours. An oily layer of crude N-chloro-n-butylformamide separated. The product was purified and its composition, $$CH_3CH_2CH_2CH_2-\underset{Cl}{N}-\underset{O}{CH}$$

was confirmed by analysis.

EXAMPLE 5

*N-bromo-n-butylformamide*

One-half mole (50.5 grams) of n-butylformamide was mixed with 0.5 mole (80 grams) of bromine in the presence of 0.5 mole of potassium hydroxide (as a 50% aqueous solution). The reaction mixture was held at 15°–20° C. for two hours during which time a 50% yield of N-bromo-n-butylformamide, $$CH_3CH_2CH_2CH_2-\underset{Br}{N}-\underset{O}{CH}$$

crystallized out. The composition of the purified product was confirmed by analysis.

The products of this invention are particularly useful in the preparation of insecticidal compounds and for conversion into isocyanates as shown in our application Serial No. 171,557, filed June 30, 1950, now U. S. 2,640,846.

We claim:

1. As a new composition of matter, an N-haloformamide having the formula $$R\!\!-\!\!\left[\underset{X}{N}\!\!-\!\!\underset{}{\overset{O}{C}}\!\!-\!\!H\right]_n$$

in which R is a hydrocarbon radical from the class consisting of (a) monovalent saturated aliphatic and cycloaliphatic hydrocarbon radicals containing one to twenty carbon atoms and (b) divalent saturated aliphatic radicals containing two and five to twenty carbon atoms, and in which X is an atom of an element from the class consisting of chlorine and bromine and n is an integer of the same value as the valence of the group represented by R.

2. N-chloro-tert.-octylformamide having the formula $$\underset{CH_3}{\overset{CH_3}{CH_3-C-CH_2-C}}\underset{CH_3\ \ Cl}{\overset{CH_3}{-N-CH}}\overset{}{\overset{}{\underset{O}{\|}}}$$

3. N-chloro-tert.-butylformamide having the formula $$(CH_3)_3C-\underset{Cl}{N}-\underset{O}{CH}$$

4. Ethylene bis(N-chloroformamide) having the formula $$\underset{O\ \ Cl}{HC-N-C_2H_4-N-CH}\ \ \underset{Cl\ O}{}$$

5. N-chloro-n-butylformamide having the formula $$CH_3CH_2CH_2CH_2-\underset{Cl}{N}-\underset{O}{CH}$$

6. N-bromo-n-butylformamide having the formula $$CH_3CH_2CH_2CH_2-\underset{Br}{N}-\underset{O}{CH}$$

References Cited in the file of this patent

UNITED STATES PATENTS 2,640,846    Hurwitz et al. _____ June 2, 1953

OTHER REFERENCES

Norton et al.: Bull. Soc. Chim. Paris, vol. 30 (1878), pp. 105–07.

Chattaway et al.: Ber. Deut. Chem., vol. 32 (1899), pp. 3573–81.

Stieglitz et al.: Ber. Deut. Chem., vol. 34 (1901), pp. 1613–16.

Slosson: Am. Chem. J., vol. 29 (1903), pp. 289–318.

Chattaway et al.: J. Chem. Soc. (London), vol. 75 (1899), pp. 1046–49.

Chattaway et al.: J. Chem. Soc. (London), vol. 87 (1905), pp. 382–85.